United States Patent [19]

Phillips et al.

[11] 4,026,972
[45] May 31, 1977

[54] METHOD OF TERMINATING OPTICAL FIBERS

[75] Inventors: Michael J. Phillips, Stanstead; Aubrey M. Crick, Epping, both of England

[73] Assignee: International Standard Electric Corporation, New York, N.Y.

[22] Filed: Apr. 1, 1976

[21] Appl. No.: 672,650

[30] Foreign Application Priority Data

May 6, 1975 United Kingdom ............. 18929/75

[52] U.S. Cl. ...................................... 264/1; 65/3 A; 65/DIG. 7; 156/294; 264/271; 264/308
[51] Int. Cl.² ........................................ B29D 11/00
[58] Field of Search ............. 264/1, 271, 279, 308, 264/DIG. 28; 156/294; 65/3 A, 4 B, DIG. 7

[56] References Cited

UNITED STATES PATENTS 3,646,186  2/1972  Hagen ............................... 264/1 X
3,861,781  1/1975  Hasegawa et al. ............... 65/4 B X
3,956,587  5/1976  Nelson ............................... 264/1 X

FOREIGN PATENTS OR APPLICATIONS 2,403,385  7/1974  Germany ............................ 65/4 B

*Primary Examiner*—Robert L. Lindsay, Jr.
*Attorney, Agent, or Firm*—Thomas L. Peterson

[57] ABSTRACT

A method of holding the bared end of a plastic sheathed optical fiber accurately on axis of a metal ferrule through which it is threaded while a potting compound is cured which cements the assembly. The method uses a silicone rubber jig cast from an accurately machined mold. The resilience of the jig enables variations in diameter to be accommodated so that holes for locating the ferrule and the bared fiber end need to be coaxial, but their size is not critical. Many jigs can be cast from a single mold reducing costs and increasing output as compared with prior methods.

5 Claims, 7 Drawing Figures

METHOD OF TERMINATING OPTICAL FIBERS

CROSS-REFERENCE TO RELATED APPLICATION

The invention disclosed herein constitutes a modification of, and in some respects an improvement upon, the invention disclosed in copending application of A. W. Horsley et al. entitled, "Optical Fiber Termination and Method", Ser. No. 550,352, filed Feb. 18, 1975.

BACKGROUND OF THE INVENTION

This invention relates to a method of manufacture of terminations for sheathed optical fibers.

For many applications the positioning of the core at the end of an optical fiber is very critical on account of its small size. For some applications, this positioning can be determined optically by directing light down the fiber, and observing from where it emerges. For other applications, this is not convenient, and positioning has to be determined mechanically by reference to a surface which is attached to, or forms part of, the fiber. In the case of a sheathed optical fiber, the sheath itself does not normally provide a satisfactory reference surface because the fiber core and cladding are not necessarily coaxial with the sheath. The cladding is a potentially satisfactory reference surface because the core is normally accurately centered within the cladding. In the case of a graded index fiber having no distinct separate cladding, the fiber itself is similarly a potentially satisfactory reference surface. An unsheathed fiber is, however, very fragile, and hence it is convenient to provide a mechanical reference surface, in the form of a ferrule, into one end of which the fiber core lies accurately on axis at the other end of the ferrule.

In the aforementioned copending Horsley et al. application, there is disclosed an optical fiber termination which assures that the center of the fiber core at the mating end of the ferrule in which it is mounted is centrally mounted on the axis of the ferrule so that the ferrule may be used as a locating surface for aligning a pair of ferrules containing fibers. In the method disclosed in the application, a portion of the sheath of a sheathed optical fiber is stripped from the end of the fiber core. The fiber is threaded through a ferrule so that the sheath terminates in its interior. The fiber core is supported outside of the ferrule by a suitable fixture so that it is coaxial with the ferrule at the point of its emergence from the ferrule. The interior of the ferrule is then filled with a potting medium which is cured while the ferrule and fiber are supported coaxially. The end face of the ferrule assembly from which the bare fiber core protrudes is then provided with a flat polished end face. By this method, there is produced a sheathed optical fiber termination in which the end of the sheath terminates within the ferrule and the bared end portion of the core is supported in the open end of the ferrule solely by the potting material with the terminal end of the core coaxial with the axis of the ferrule. That is, the potting medium centrally locates the terminal end of the fiber core in the ferrule. While the method is generally satisfactory, it is somewhat costly particularly for reliable, high production of terminations.

The purpose of the present invention is to provide an improved, less costly method for obtaining the necessary fiber alignment at the free end of the ferrule.

SUMMARY OF THE INVENTION

According to the present invention, there is provided a method of making a sheathed optical fiber termination comprising a hollow cylindrical ferrule through which the fiber is threaded its sheathing terminating within the ferrule, and in which ferrule the fiber is secured to lie with its unsheathed end section on axis at one end thereof, wherein the fiber and ferrule are held in position in a circularly symmetric elastomeric jig while a potting compound for securing the fiber within the ferrule is cured. The jig has a smaller axial hole for accommodating the unsheathed end section of the fiber extending from the end of a larger axial hole for accommodating the ferrule. The ferrule and the unsheathed end section of the fiber are each gripped by the sidewalls of their respective holes either by arranging for the hole diameter to be undersized or by the application of axial compression to the jig to shrink the diameter of an oversized diameter hole.

BRIEF DESCRIPTION OF THE DRAWINGS

FIGS. 2 and 3 depict stages in the manufacture of the optical fiber termination using the jig made in the mold illustrated in FIG. 1;

FIG. 4 is a partial longitudinal section of the completed termination;

DESCRIPTION OF THE PREFERRED EMBODIMENTS

Figure 1:
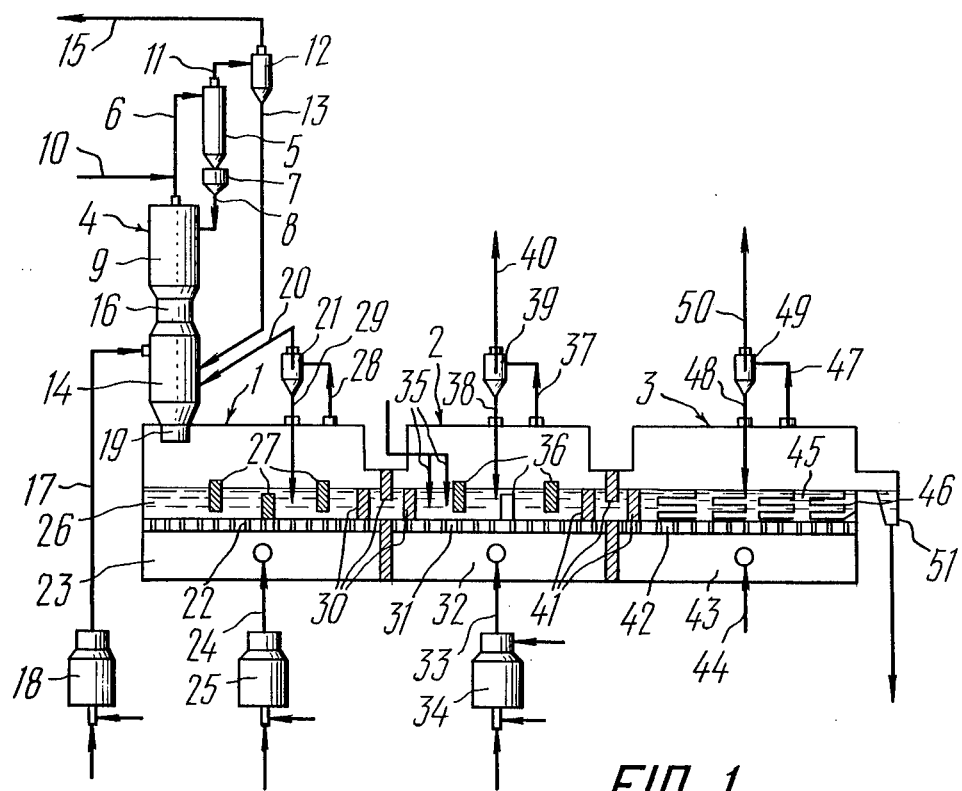
FIG. 1 is a partial vertical sectional view through a mold for casting a jig for making an optical fiber termination according to the present invention.
Figure 2:
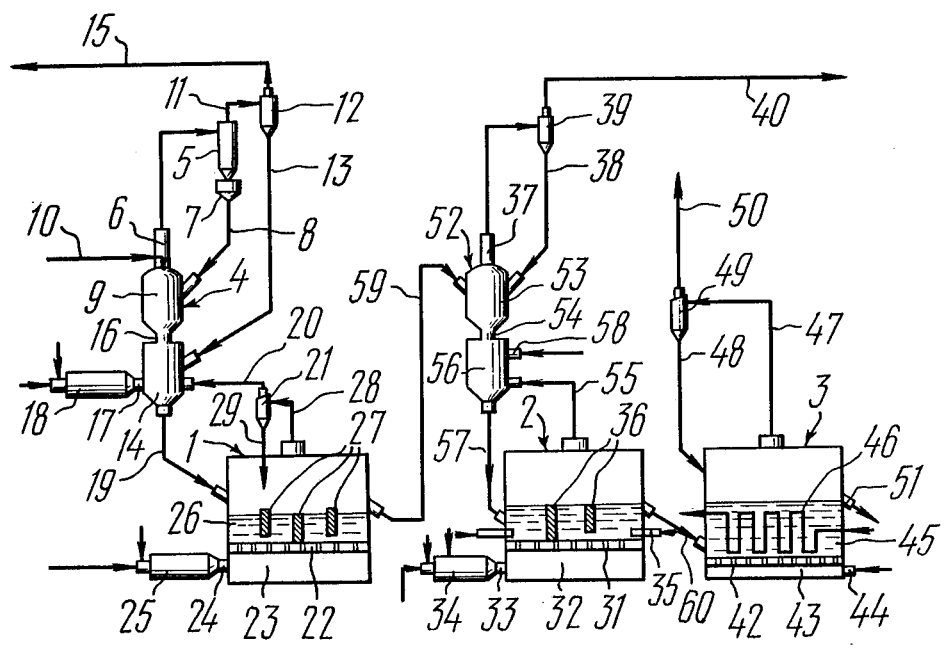
Figure 1:
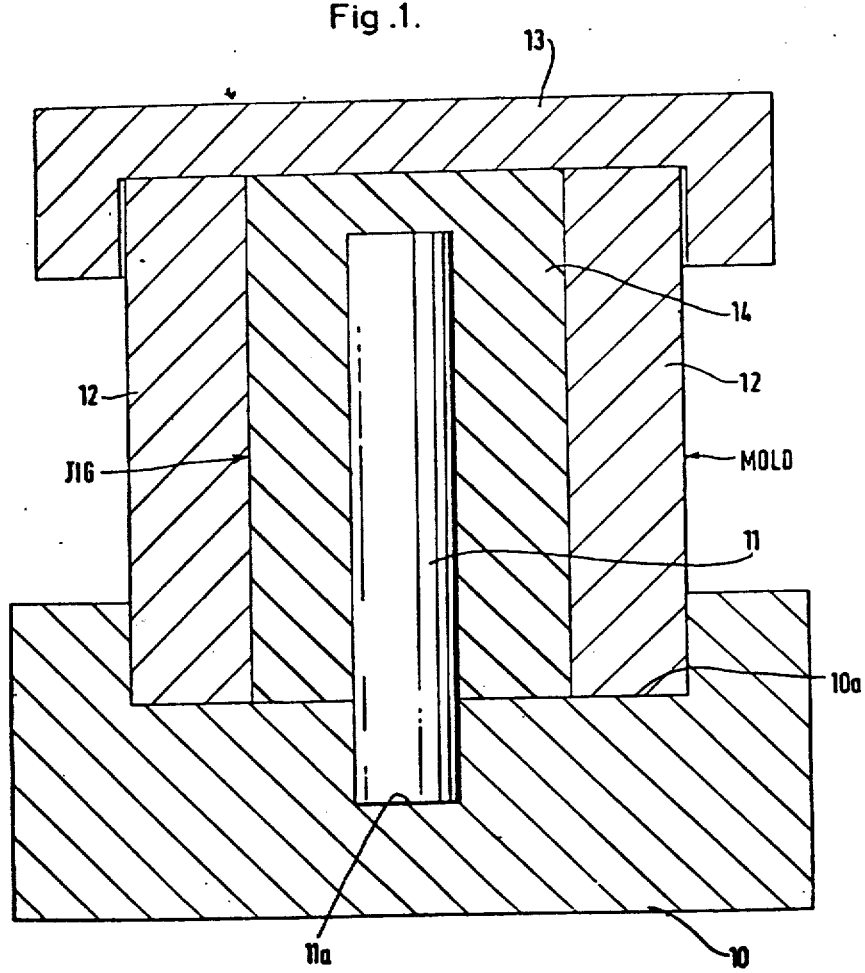

A metallic mold for making a resilient jig for the first method of making an optical fiber termination is shown in FIG. 1, and consists essentially of a base 10, a pin 11, a tube 12, and a lid 13. A shallow blind hole 10a is machined in the base 10 to house the end of the tube 12, and a further blind hole 11a of smaller diameter is machined in the base to house the end of the pin 11. The mold is filled with a suitable elastomeric material, such as a room temperature vulcanizing silicone rubber, to form the jig 14. The lid 13 is then pressed home, and then the rubber is cured. Typically, curing is performed at about 120° C for an hour. The cured silicone rubber molded part 14 is removed from the mold and used as a jig in the manner now to be described with reference to FIGS. 2 and 3.

First, an accurately centered hole 15 has to be made in the base 20 of the jig 14. This is made with a piercing tool 21, whose shank is dimensioned to slide in the bore 14a of the jig 14. The piercing tool 21 is mounted in a drill press (not shown), and then the jig 14 is placed over its long slender point 22. The piercing tool is gently lowered in the drill press until the jig bears against a flat bed (not shown), whereupon a small further lowering carries the point through the base of the jig 14 and a short distance into the bed. The piercing tool is removed from the drill press, and a fine hypodermic needle 24 is placed over the point and used to push the piercing tool back out of the jig.

At this stage, a steel ferrule 30, typically 12.5 or 25 mm long, and having internal and external diameters of 1.4 and 1.8 mm, respectively, is inserted downwardly into the bore 14a of the jig 14. The diameter of the bore 14a is slightly less than the external diameter of the ferrule, so that upon insertion of the ferrule, the ferrule is gripped by the jig. With the hypodermic needle 24 still in position in the jig, epoxy resin 31 is introduced from a syringe (not shown) into the annular space between the ferrule and the needle.

A length of sheathing is stripped from the end of a plastic sheathed optical fiber 32, for instance, by means of a hot coil of resistance wire and then the stripped end 33 is inserted into the hypodermic needle 24 until the sheath comes to rest against the needle tip, as seen in FIG. 3. The needle and optical fiber are then lowered together until the sheath enters a certain distance into the ferrule. At this stage, the level of the resin is preferably at the point of overflowing. Next the hypodermic needle is fully removed from the jig, a small fillet 40 of resin is dispensed around the point of emergence of the sheath from the ferrule to provide additional strength at this region and then the resin is cured.

Finally, the termination assembly is withdrawn from the jig, any excess epoxy resin is removed, and the end is lapped and polished to give an optical finish to the fiber end 41.

The bore 14a of the jig does not need to be as deep as the length of the ferrule, but it is preferred to make its depth at least four to five times its diameter. Particularly if the sheathed fiber has previously been wound on a drum, it is liable to be curved rather than straight. This means that if the sheath enters deep into the ferrule, its end tends to be pressed against the sidewall of the ferrule, and may thereby put an unnecessarily sharp curve into the stripped fiber, or even stress the fiber to the extent that it will distort the hole in the jig base taking it off axis. Therefore, it is preferred to introduce the sheath only a short distance into the ferrule, typically only 1 to 2 mm.

Figure 5:
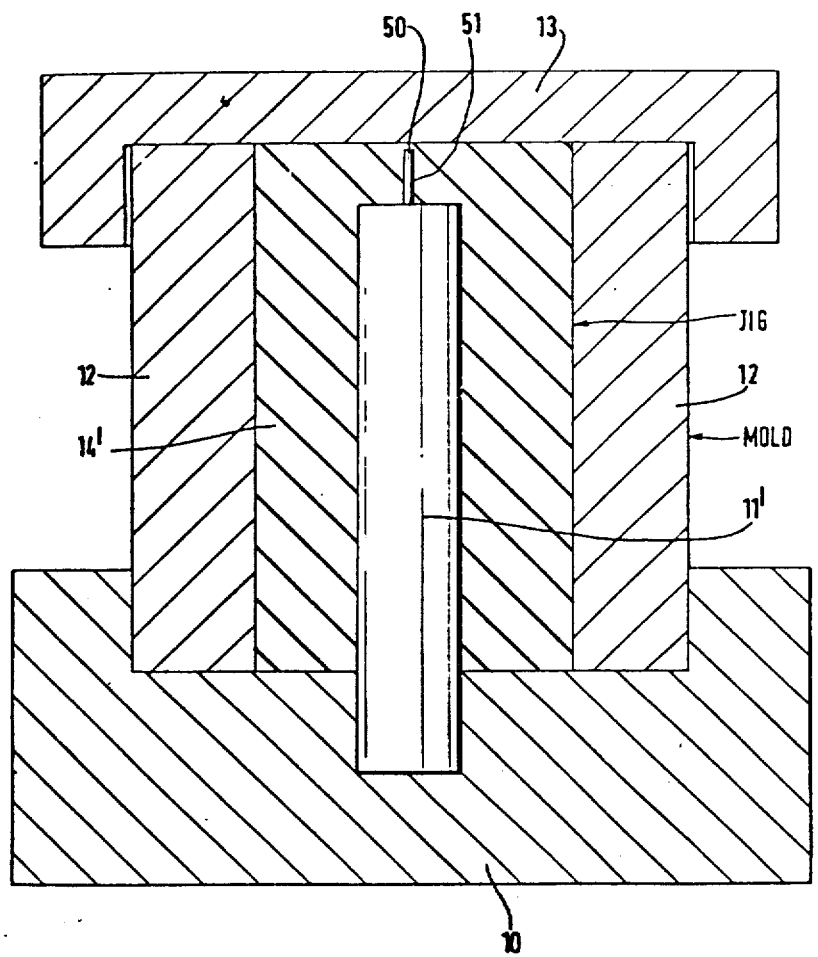
FIGS. 5 and 6 depict alternative molds for casting jigs of modified construction.

In an alternative method of making an optical fiber termination, the use of a piercing tool is dispensed with and instead a modified jig 14' is employed, which has been molded with a small diameter hole in its base slightly smaller than the diameter of the stripped fiber. The mold, which is depicted in FIG. 5, is essentially the same as that depicted in FIG. 1 with the difference that the pin 11' is provided at its tip with a short, much finer, accurately coaxial secondary pin 50, typically 65 to 70 um in diameter, and 1 mm in length. The composite pin structure is conveniently machined in silver steel. The secondary pin 50 is so fine and fragile that it is preferred not to attempt to make it long enough to reach the lid 13. Therefore, the hole 51 that it leaves, upon withdrawal from the jig, is blind. The hole 51 is exposed by paring away the jig base.

The stripped fiber end may be threaded through the hole 51 in the base of the jig 14' with the aid of a fine hypodermic needle. In this case, the hypodermic needle is inserted through the existing hole in the base, and then the further stages of manufacture of the termination are the same as those described previously with reference to FIGS. 2, 3, and 4.

Alternatively, it has been found possible to thread a stripped fiber end directly through the hole 51. A rather longer length of the fiber has to be stripped than was necessary previously. In this instance the length of stripped fiber must be significantly longer than the ferrule and the jig. That is so that the resin can be inserted after threading the fiber end through the hole in the base of the jig, without the mouth of the jig and ferrule assembly being obstructed by the presence of the fiber sheath. After the resin has been dispensed from a syringe into the ferrule, the optical fiber is eased gently deeper into the jig by pulling on the end protruding from the base. The amount of resin dispensed into the ferrule does not, initially, quite fill it, but when the sheath enters the ferrule the extra displacement brings the level up to the brim.

As before, a fillet of additional resin may be applied at the point of emergence of the sheath from the ferrule in order to provide additional strength at this point. The succeeding process steps of curing the resin, and of lapping and polishing the end, are carried out as before to produce a completed termination as depicted in FIG. 4.

The two preceding examples have used jigs provided with holes in their bases that are smaller in diameter than the stripped fibers that have to thread them, and this means that special care or special tools have to be employed to do the threading. The second example also involves the problem of the accurate machining of a particularly fine secondary pin 50. Some of these problems can be alleviated or avoided by using a construction of a jig having a hole in its base which is larger in diameter than that of the fiber to thread it, but which can be symmetrically collapsed around the fiber. Such a jig will now be described with reference to FIG. 6.

Figure 6:
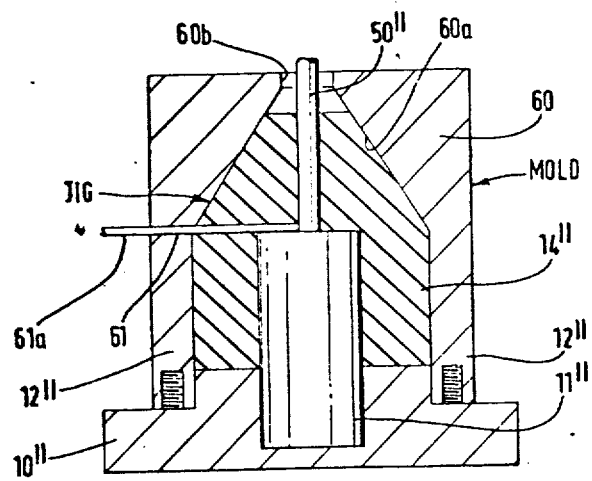
Figure 7:
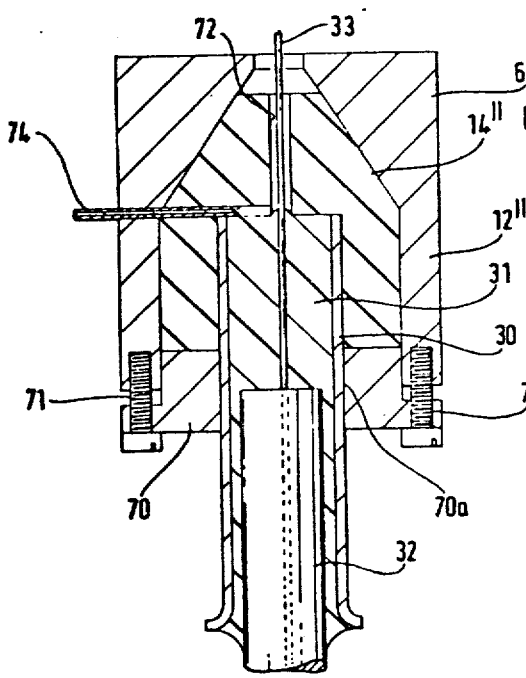
FIG. 7 depicts a stage in the manufacture of a termination using a jig made in the mold of FIG. 6.

The jig 14" of FIG. 6 is, like the jigs previously described, made in a metallic mold. The base 10" is similar to the previous bases. The pin 11" is like the pin 11' in having a secondary finer coaxial pin, but in this instance the secondary pin 50" is of larger diameter than that of the unsheathed fiber, instead of smaller. The tube 12, however, is replaced with a substantially cylindrical structure 12", which is parallel sided at its bases, but which, near its top, includes a portion 60 having an inwardly tapering conical internal surface 60a. A fine hole 61 is drilled in the side to accommodate a pin 61a, which extends across to the shoulder at the roof of the secondary pin 50". A hole 60b at the top of the structure 12" receives the secondary pin 50" therethrough. The mold is filled with a room temperature vulcanizing silicone rubber which is cured to form the jig 14".

After the curing, the base 10" and pin 11" are removed, and also the pin 61a, but the jig 14" is itself left in position within the structure 12". A pressure plate 70 is then secured to the structure 12" by screws 71. Later these screws are tightened to drive the pressure plate 70 upwardly into the structure 12" so as to provide axial compression of the jig 14", which by the action of the taper 60a, is transformed into radial compression which causes the diameter of the hole 72 in the jig to shrink.

The ferrule 30 is inserted through an aperture 70a in the pressure plate as far as it will go into the jig 14". Next, the stripped end 33 of the plastic sheathed optical fiber 32 is inserted through the pressure plate aperture and through the hole 72 in the jig 14". Then epoxy resin 31 is introduced into the interior of the ferrule 30 via a hypodermic needle 74 introduced into the hole 61 and the hole in jig 14" previously occupied by the pin 61a. When the interior is full, the needle is removed, the screws 71 are tightened to cause the hole 72 to collapse on the stripped fiber 33, and then the resin is cured.

After the curing of the resin, the ferrule assembly is removed from the jig, and its end is lapped and polished to provide a completed sheathed optical fiber termination as depicted in FIG. 4.

It may be noted that with each of the above described methods of making optical fiber terminations, the concentricity of the fiber end with the ferrule does not rely upon machining concentric surfaces on the individual ferrule, but rather upon machining accurately concentric surfaces, upon the piercing tool in the case of the first method, and upon the central mold pins in the case of the second and third methods. In either instance, it will be appreciated that many jigs may be made using the one piercing tool or mold pin, and each of the jigs can be reused to make a number of terminations. It may further be noted that although accurate, concentricity is required of the machining operation, the actual diameters machined are not critical because of the resilience of the jig.

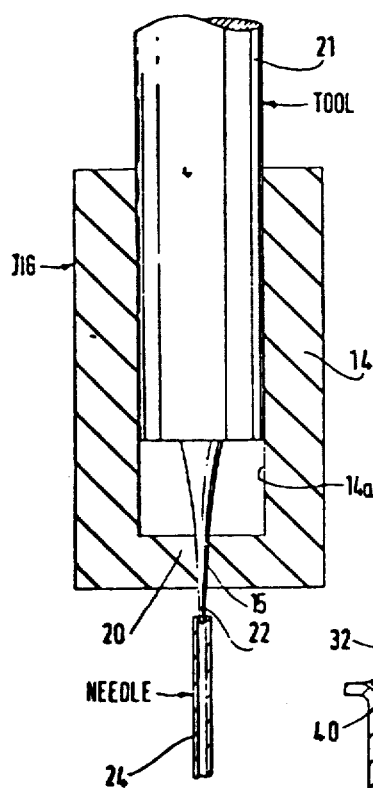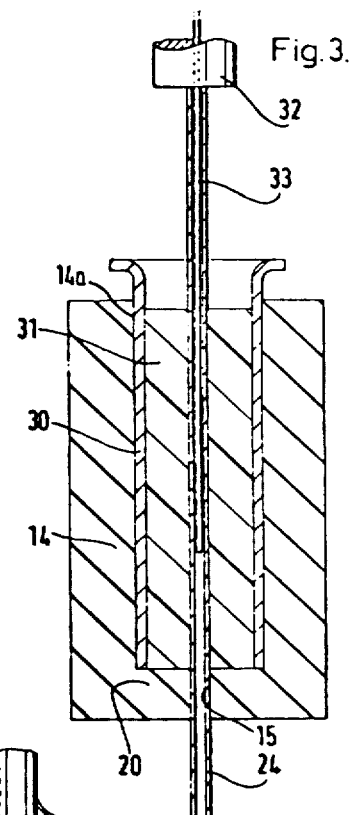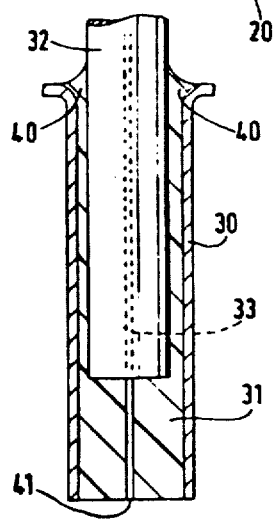

We claim:

1. A method of making a sheathed optical fiber termination comprising a hollow cylindrical ferrule through which an optical fiber is threaded with its sheathing terminating within the ferrule and in which ferrule the fiber is secured to lie with its unsheathed end section on axis at one end thereof, comprising the steps of:

providing a circularly symmetrical elastomeric jig having a smaller hole dimensioned to receive the unsheathed end section of the fiber and a larger axial hole dimensioned to receive the ferrule;

mounting the ferrule in the larger hole and the unsheathed end section of the fiber in the smaller hole;

causing the sidewalls of the longer and smaller holes, respectively, to grip the ferrule and unsheathed end section of the fiber;

filling the ferrule with a potting compound either before or after mounting the unsheathed end section of the fiber in the smaller hole; and allowing the potting compound to cure.

2. A method as set forth in claim 1 wherein:

the sidewalls of the larger and smaller holes are caused to grip the ferrule and unsheathed end section of the fiber by frictionally forcing the ferrule and end section into said holes.

3. A method as set forth in claim 1 wherein:

the sidewalls of the larger and smaller holes are caused to grip the ferrule and unsheathed end section of the fiber by applying an axially compressive force to the jig to reduce the cross-section of said holes.

4. A method as set forth in claim 1 wherein:

the unsheathed end section of the fiber is threaded through the smaller hole in the jig inside the bore of hypodermic tubing previously inserted through the smaller hole, and the hypodermic tubing is removed prior to the curing of the potting compound.

5. A method as set forth in claim 4 wherein:

the smaller axial hole in the jig is made with piercing tool which is aligned by the wall of the larger axial hole.

* * * * *

UNITED STATES PATENT OFFICE
CERTIFICATE OF CORRECTION

Patent No. 4,026,972  Dated May 31, 1977

Inventor(s)  Michael James Phillips et al.

It is certified that error appears in the above-identified patent and that said Letters Patent are hereby corrected as shown below:

The drawings in the patent should be replaced by the drawings as shown on the attached sheets.

Signed and Sealed this

Seventeenth Day of October 1978

[SEAL]

Attest:

RUTH C. MASON
*Attesting Officer*

DONALD W. BANNER
*Commissioner of Patents and Trademarks*